United States Patent
Saito et al.

(10) Patent No.: US 8,744,254 B2
(45) Date of Patent: *Jun. 3, 2014

(54) LENS CONTROL DEVICE AND IMAGE SENSING DEVICE USING SAME

(71) Applicant: Rohm Co., Ltd., Kyoto (JP)

(72) Inventors: Akihito Saito, Kyoto (JP); Koji Saito, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,620

(22) Filed: Aug. 7, 2013

(65) Prior Publication Data

US 2013/0322861 A1     Dec. 5, 2013

Related U.S. Application Data

(63) Continuation of application No. 13/325,206, filed on Dec. 14, 2011, now Pat. No. 8,526,803.

(30) Foreign Application Priority Data

Dec. 28, 2010  (JP) ................................ 2010-292729

(51) Int. Cl.
   *G03B 17/00*  (2006.01)
   *G03B 5/00*   (2006.01)

(52) U.S. Cl.
   CPC .......... *G03B 5/00* (2013.01); *G03B 2205/0007* (2013.01)
   USPC ............................................................ 396/55

(58) Field of Classification Search
   None
   See application file for complete search history.

(56) References Cited

U.S. PATENT DOCUMENTS

| 4,970,540 | A | 11/1990 | Vasey et al. | |
| 8,526,803 | B2 * | 9/2013 | Saito et al. ...................... | 396/55 |
| 2009/0034950 | A1 | 2/2009 | Takagi et al. | |
| 2010/0124411 | A1 | 5/2010 | Hirayama | |
| 2011/0158618 | A1 | 6/2011 | Ibi | |
| 2011/0194847 | A1 | 8/2011 | Wakamatsu | |
| 2012/0163784 | A1 | 6/2012 | Saito et al. | |
| 2012/0207457 | A1 | 8/2012 | Miyasako | |

FOREIGN PATENT DOCUMENTS

| JP | 2007-208832 | 8/2007 |
| JP | 2010-124101 | 6/2010 |

* cited by examiner

*Primary Examiner* — W B Perkey
(74) *Attorney, Agent, or Firm* — Fish & Richardson P.C.

(57) ABSTRACT

There is provided a lens control device that feeds a motor current to a lens drive motor which drives lens according to the motor current, the lens control device including: a servo computation portion that calculates a motor current setting value such that a deviation of the position of the lens to which a correction offset has been adjusted from a target position is reduced; a motor driver that generates the motor current according to the motor current setting value; and a calibration computation portion that adjusts the correction offset such that an average value of the motor current approaches zero.

9 Claims, 6 Drawing Sheets

LENS CONTROL DEVICE AND IMAGE SENSING DEVICE USING SAME

CROSS-REFERENCE TO RELATED APPLICATIONS

This application is a continuation of U.S. application Ser. No. 13/325,206, filed Dec. 14, 2011, which claims priority from Japanese Patent Application No. 2010-292729 filed on Dec. 28, 2010, the contents of which are hereby incorporated by reference.

BACKGROUND OF THE INVENTION

1. Field of the Invention

The present invention relates to a lens control device and an image sensing device using such a lens control device.

2. Description of Related Art

Conventionally, there is proposed an image sensing device that has a camera shake correction function of an optical lens shift type (hereinafter simply referred to as the "camera shake correction function"). In the camera shake correction function, when a camera shake occurs, the target position of the lens is calculated such that the blurring of an image is reduced. Then, the lens is shifted to the target position, and thus the camera shake correction is achieved.

In the image sensing device having the camera shake correction function, in general, the lens is movably supported by a spring to a lens unit. The lens is also shifted by a voice coil motor (VCM) to the target position. The VCM is designed to drive (shift) the lens according to a motor current that has been fed.

In the image sensing device having the conventional camera shake correction function, control is performed such that the position of the lens basically coincides with a reference position (for example, the center position of a range of movement) that is fixed within the range of movement of the lens. In other words, when the camera shake correction function is disabled or when no camera shake occurs, the posture of the lens is held in the reference position. When the camera shake correction is performed, the lens is shifted with the reference position being the center of the movement.

FIG. 7 is a diagram schematically showing an example of the support form of the lens. In FIG. 7, the vertical direction represents the direction in which the lens is moved (here, only one direction is considered), and O point (a balance position when the weight of the lens is ignored) is the reference position. In the left side of the FIG. 7, a state where the drive force of the lens exerted by the VCM is zero is shown; in the right side of FIG. 7, a state where the lens is being shifted by the VCM to the reference position is shown.

As shown in the left side of FIG. 7, when the drive force of the lens exerted by the VCM is zero, the lens 51 is present in a position (hereinafter also referred to as a balance position) where the weight of the lens 51 balances the elastic force of springs 52 and 53. Specifically, the position of the lens 51 is a position that is obtained by displacing the reference position by $l = mg \sin \theta / 2k$, where m represents the weight of the lens, g represents the gravitational acceleration, θ represents an angle formed by the direction of the movement and the direction of gravity and k represents a spring constant.

On the other hand, as shown in the right side of FIG. 7, in order to hold the lens 51 in the reference position that has been displaced from the balance position, it is necessary to continuously apply the corresponding force to the lens 51. Specifically, in order to hold the lens 51 in the reference position, a constant drive force exerted by the VCM is needed. As the drive force that the VCM is required to exert is increased, a motor current that needs to be fed to the VCM is increased.

For the reason described above, when the lens is held in the reference position, as compared with a case where the lens is held in the balance position, a large motor current is needed. Likewise, even when the lens is shifted with the reference position being the center of the movement, as compared with a case where the lens is shifted with the balance position being the center, a large motor current is needed.

In terms of power consumption saving and the like, the motor current necessary for controlling the position of the lens is preferably minimized. In particular, in a mobile image sensing device that is used in a mobile telephone or the like, since a power supply capacity is often limited, it is extremely required to reduce the motor current.

Under the above conditions, the position in which the lens is held and the center of the shift movement are preferably present near the balance position. The change of orientation of the image sensing device (for example, caused by the holding of the image sensing device upside down by a user) or the like changes the direction in which the weight of the lens acts (the direction relative to the orientation of the image sensing device), and the balance position is changed accordingly. Hence, in order to keep the position in which the lens is held and the center of the shift movement near the balance position, it is necessary that the position in which the lens is held and the center of the shift movement can follow the change of the balance position.

SUMMARY OF THE INVENTION

In view of the foregoing problem, the present invention has an object to provide: a lens control device that can keep the position in which the lens is held and the center of the shift movement near the balance position; and an image sensing device using such a lens control device.

To achieve the above object, according to the present invention, there is provided a lens control device that feeds a motor current to a lens drive motor which drives lens according to the motor current, the lens control device including: a servo computation portion that calculates a motor current setting value such that a deviation of the position of the lens to which a correction offset has been adjusted from a target position is reduced; a motor driver that generates the motor current according to the motor current setting value; and a calibration computation portion that adjusts the correction offset such that an average value of the motor current approaches zero.

Alternatively, in the configuration described above, based on a lens position detection signal indicating the current position of the lens, a target lens position setting signal indicating the target position and a correction offset signal indicating the correction offset, a deviation signal corresponding to the deviation is generated, and, based on the deviation signal, the motor current setting value is calculated.

Alternatively, in the configuration described above, the calibration computation portion integrates the motor current setting value, and adjusts, based on the result of the integration, the correction offset.

Alternatively, in the configuration described above, the servo computation portion performs PID processing on the deviation signal, and the calibration computation portion adjusts the correction offset using information on an integration component obtained in the PID processing.

Alternatively, in the configuration described above, the correction offset signal is used such that the target lens position setting signal is corrected.

Alternatively, in the configuration described above, the lens position detection signal is generated by converting, into a digital signal, an analogue signal that is output from a lens position detection sensor and that indicates the current position, and the analogue signal is corrected using the correction offset signal.

Alternatively, in the configuration described above, the lens position detection signal is generated by converting, into a digital signal, an analogue signal that is output from a lens position detection sensor and that indicates the current position, and the digital signal is corrected using the correction offset signal.

Alternatively, in the configuration described above, the target lens position setting signal is generated based on the result of detection of an angular velocity sensor.

According to the present invention, there is provided an image sensing device including: a lens; a lens position detection sensor that detects the current position of the lens; a lens drive motor that drives the lens according to a motor current; and the lens control device configured as described above that feeds the motor current to the lens drive motor.

BRIEF DESCRIPTION OF THE DRAWINGS

The above object, other objects and features of the present invention will become further apparent from the following description of preferred embodiments and the reference to accompanying drawings illustrating the followings.

DETAILED DESCRIPTION OF PREFERRED EMBODIMENTS

Embodiments of the present invention will be described below using first to fourth embodiments as examples.

<First Embodiment>

Figure 1:
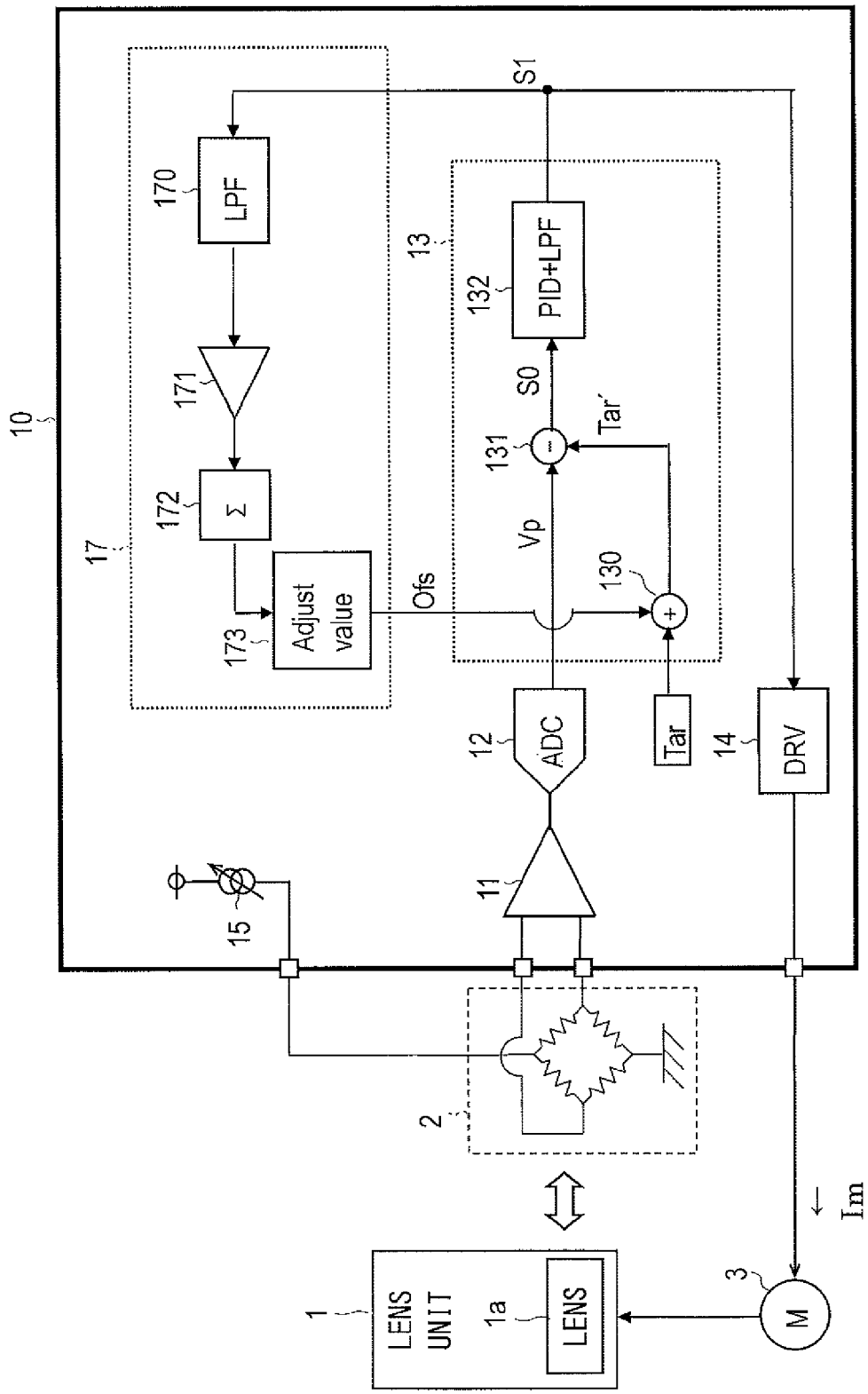
FIG. 1 is a block diagram of a lens control device according to a first embodiment of the present invention.

The first embodiment of the present invention will first be described. FIG. 1 is a block diagram of a lens control device (furthermore, an image sensing device including such a lens control device) according to the first embodiment of the present invention. The image sensing device of the present embodiment includes a lens unit 1, a Hall sensor 2, a lens drive motor 3 and the lens control device 10; the image sensing device has a camera shake function.

Figure 7:
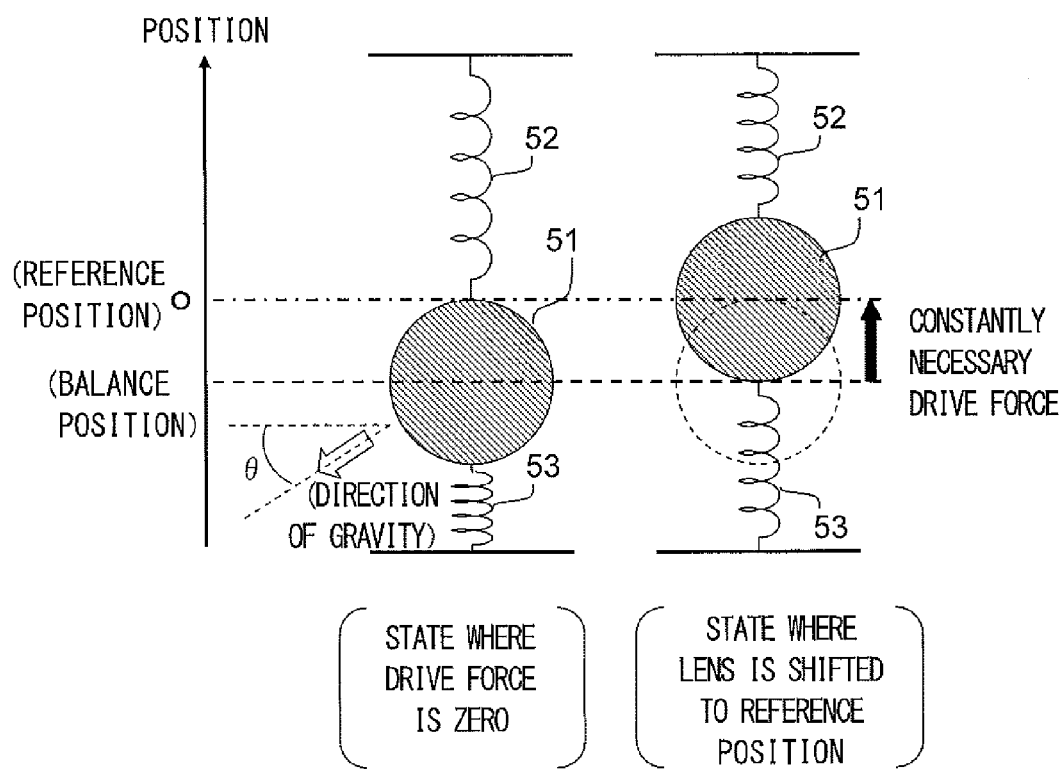
FIG. 7 is a diagram illustrating the support form of a lens.

The lens unit 1 includes a lens 1a used for camera shake correction, and forms, with the lens 1a, an optical image of a subject on an image sensing element (such as a CCD (charge coupled device) or a CMOS (complementary metal oxide semiconductor)). The lens 1a is a movable member that is elastically supported by a spring (elastic member) to a fixation portion of the lens unit 1. In other words, in principle, the lens 1a is supported in a form equivalent to, for example, that shown in FIG. 7.

The Hall sensor 2 is a sensor that detects the position of the lens 1a (the current position). The Hall sensor 2 continuously generates a lens position detection signal Vp (analog voltage signal) indicating the position of the lens 1a, and feeds it to the lens control device 10 (an amplifier 11). As the sensor that detects the position of the lens 1a, instead of the Hall sensor, for example, a photoreflector may be used.

The lens drive motor 3 drives the lens 1a with a drive force corresponding to a motor current Im. The position of the lens 1a corresponds to the weight of the lens 1a, the elastic force of the spring which supports the lens 1a and a drive force exerted by the lens drive motor 3. Although, in the present embodiment, the lens drive motor 3 is assumed to be a VCM, a motor of another type whose drive force and the like are changed according to the motor current Im may be used.

The lens control device 10 is a semiconductor device that is obtained by integrating the amplifier 11, an analogue/digital converter 12, a servo computation portion 13, a motor driver 14, a current source 15 and a calibration computation portion 17.

The amplifier 11 amplifies the lens position detection signal Vp (analogue voltage signal) input from the Hall sensor 2, and outputs the resulting signal to the analogue/digital converter 12.

The analogue/digital converter 12 converts, from analogue to digital, the lens position detection signal Vp (analogue voltage signal) that has been amplified and that has been input from the amplifier 11, and outputs the resulting signal to the servo computation portion 13.

The servo computation portion 13 receives: the lens position detection signal Vp (digital signal) that has been input from the Hall sensor 2 through the amplifier 11 and the analogue/digital converter 12; a target lens position setting signal Tar; and a correction offset signal Ofs.

The target lens position setting signal Tar is a digital signal that is generated based on the result of detection by an unillustrated gyro sensor (an angular velocity sensor that detects the amount of camera shake) that is attached to the image sensing device of the present embodiment. The target lens position setting signal Tar indicates the target position (a position that reduces the blurring of an image) of the lens 1a. The correction offset signal Ofs is a digital signal whose value is adjusted by the calibration computation portion 17. The generation process and significance of the correction offset signal Ofs will become apparent from the following description.

The servo computation portion 13 includes a first addition circuit 130, a subtraction circuit 131 and a filter circuit 132. The first addition circuit 130 adds the correction offset signal Ofs to the target lens position setting signal Tar to generate a corrected target lens position setting signal Tar'(=Tar+Ofs). The subtraction circuit 131 subtracts the lens position detection signal Vp from the corrected target lens position setting signal Tar' to generate a deviation signal S0 (=Tar'−Vp).

The deviation signal S0 can be regarded as a signal that is generated based on the lens position detection signal Vp, the target lens position setting signal Tar and the correction offset signal Ofs. The deviation signal S0 can be considered to indicate the deviation (=Tar+Ofs−Vp) of the position of the lens from the target position (=Tar+Ofs) to which a correction offset has been added.

The filter circuit 132 is a circuit that calculates a motor current setting value S1 by performing, on the deviation signal S0, predetermined digital filter processing (including PID (p: proportional, I: integral, D: differential) processing and LPF (low pass filter) processing. The filter circuit 132 generates, based on the deviation signal S0, the motor current setting value S1 such that the above deviation is reduced (specifically, such that the deviation signal S0 approaches zero).

The motor driver 14 has an output stage of, for example, an H-bridge type, generates the motor current Im corresponding to the motor current setting value S1 and feeds it to the lens drive motor 3. The current source 15 feeds a constant current to the Hall sensor 2.

The calibration computation portion 17 includes: a low pass filter 170 that digitally smooths the motor current setting value S1; an amplifier 171 that adjusts the gain of an output signal of the low pass filter 170; an integrator 172 that performs digital integration processing on the output signal of the amplifier 171; and an offset signal generation circuit 173 that generates the correction offset signal Ofs and that outputs it to the servo computation portion 13 (the first addition circuit 130). The low pass filter 170 can remove a noise component that is superimposed on the motor current setting value S1.

The offset signal generation circuit 173 generates the correction offset signal Ofs such that the output signal of the integrator 172, that is, the integration value (a value corresponding to the average value of the motor current setting value S1) of the motor current setting value S1 approaches zero. Thus, the correction offset signal Ofs is adjusted such that the average value of the motor current Im approaches zero.

When, as described above, the correction offset signal Ofs is fed back, thus the motor current setting value S1 is generated such that the average value of the motor current Im approaches zero. In this way, the drive force of the lens drive motor 3 approaches zero, and hence the position of the lens 1a approaches a position (balance position) in which the weight of the lens 1a balances the elastic force of the spring.

Therefore, in the image sensing device of the present embodiment, when no camera shake occurs, the lens 1a is held in the balance position. When a camera shake occurs, the shifting of the lens 1a for the camera shake correction is performed such that the balance position is the center of the movement. Hence, in the image sensing device of the present embodiment, as compared with an image sensing device having a specification (for convenience, referred to as a "conventional specification") where the position in which the lens is held and the center of the shift movement are fixed, an electric power necessary for controlling the position of the lens can be significantly reduced.

Figure 2:
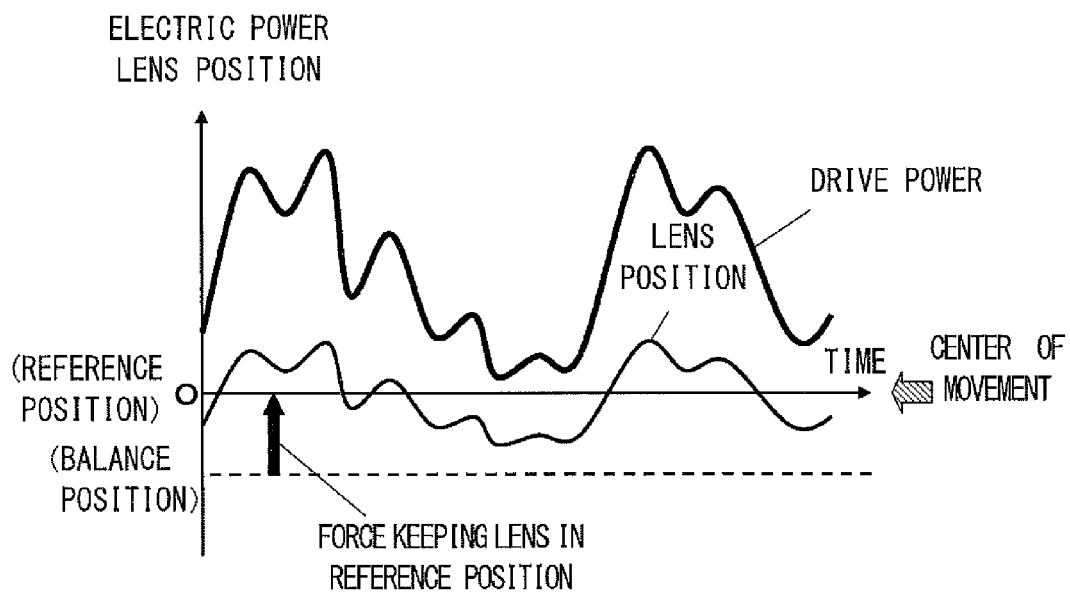
FIG. 2 is a graph on power consumption when camera shake correction is performed.
Figure 3:
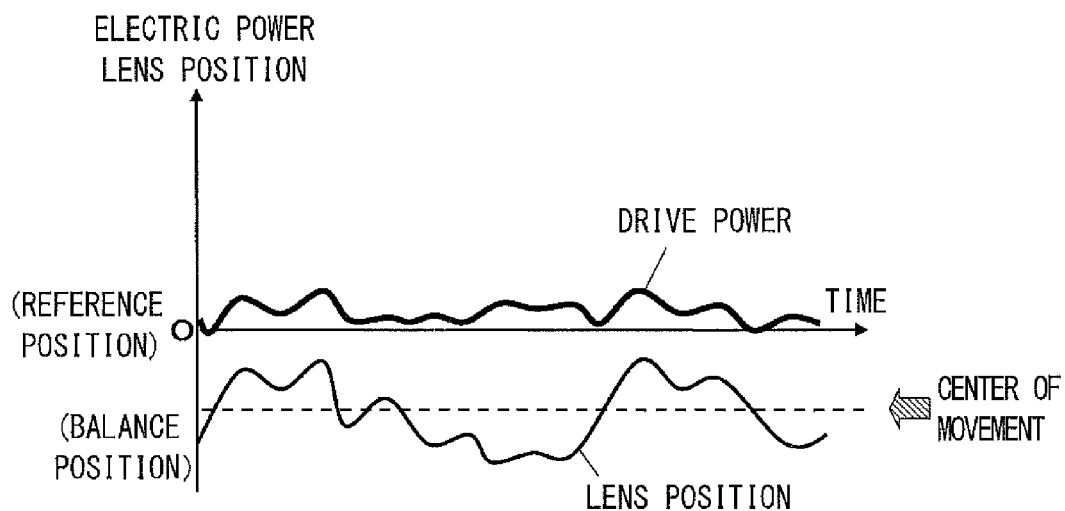
FIG. 3 is a graph on power consumption when camera shake correction is performed.

Here, for the image sensing device of the conventional specification, an example of a graph showing the position of the lens and the power consumption of the VCM (the lens drive motor) when the camera shake correction is performed is shown in FIG. 2; for the image sensing device of the present embodiment, an example thereof is shown in FIG. 3. For ease of comparison, both graphs show states when camera shakes of approximately the same magnitude occur.

In the camera shake correction of the image sensing device of the conventional specification, the center of the shift movement of the lens is fixed in the reference position. Hence, a force for keeping the lens in the reference position (a force that is needed because the reference position is displaced from the balance position) is constantly added to a drive force necessary for shifting the lens. Therefore, in the image sensing device of the conventional specification, as shown in FIG. 2, the power consumption of the VCM necessary for the camera shake correction is increased.

On the other hand, in the camera shake correction of the image sensing device of the present embodiment, the center of the shift movement of the lens substantially coincides with the balance position. Hence, in the image sensing device of the present embodiment, as shown in FIG. 3, as compared with the image sensing device of the conventional specification, the power consumption of the lens drive motor 3 necessary for the camera shake correction is significantly reduced.

The change of orientation of the image sensing device (for example, caused by the holding of the image sensing device upside down by a user) or the like changes the direction in which the weight of the lens acts, and the balance position is changed accordingly. However, since the lens control device 10 adjusts the correction offset such that the average value of the motor current Im approaches zero, the position in which the lens is held and the center of the shift movement are allowed to follow the change of the balance position described above. Thus, the lens control device 10 can keep the position in which the lens is held and the center of the shift movement near the balance position.

The lens control device 10 detects the direction of gravity affecting the balance position, using information on the motor current setting value S1 (a value that determines the amount of drive of the motor). Hence, when the lens control device 10 detects the direction of gravity, a detector such as an acceleration sensor is not needed.

The lens control device 10 of the present embodiment adjusts the correction offset signal Ofs such that the average value of the motor current Im approaches zero. In order to achieve the adjustment described above, the lens control device 10 of the present embodiment employs a method of generating the correction offset signal Ofs such that the integration value of the motor current setting value S1 approaches zero.

In order to achieve the adjustment described above, a method different from that of the present embodiment may be employed. An example of the embodiment of the present invention employing the different method will be described later in the second embodiment.

The lens control device 10 of the present embodiment generates the deviation signal S0 corresponding to the deviation of the position of the lens 1a from the target position to which the correction offset has been added. In order to achieve the generation of the deviation signal S0, the lens control device 10 of the present embodiment uses the correction offset signal Ofs to correct the target lens position setting signal Tar, and thereby generates the corrected target lens position setting signal Tar', and furthermore subtracts the lens position detection signal Vp from the corrected target lens position setting signal Tar', and thereby generates the deviation signal S0.

In order to achieve the generation of the deviation signal S0, a method different from that of the present embodiment may be employed. An example of the embodiment of the present invention employing the different method will be described later in the third and fourth embodiments.

<Second Embodiment>

Figure 4:
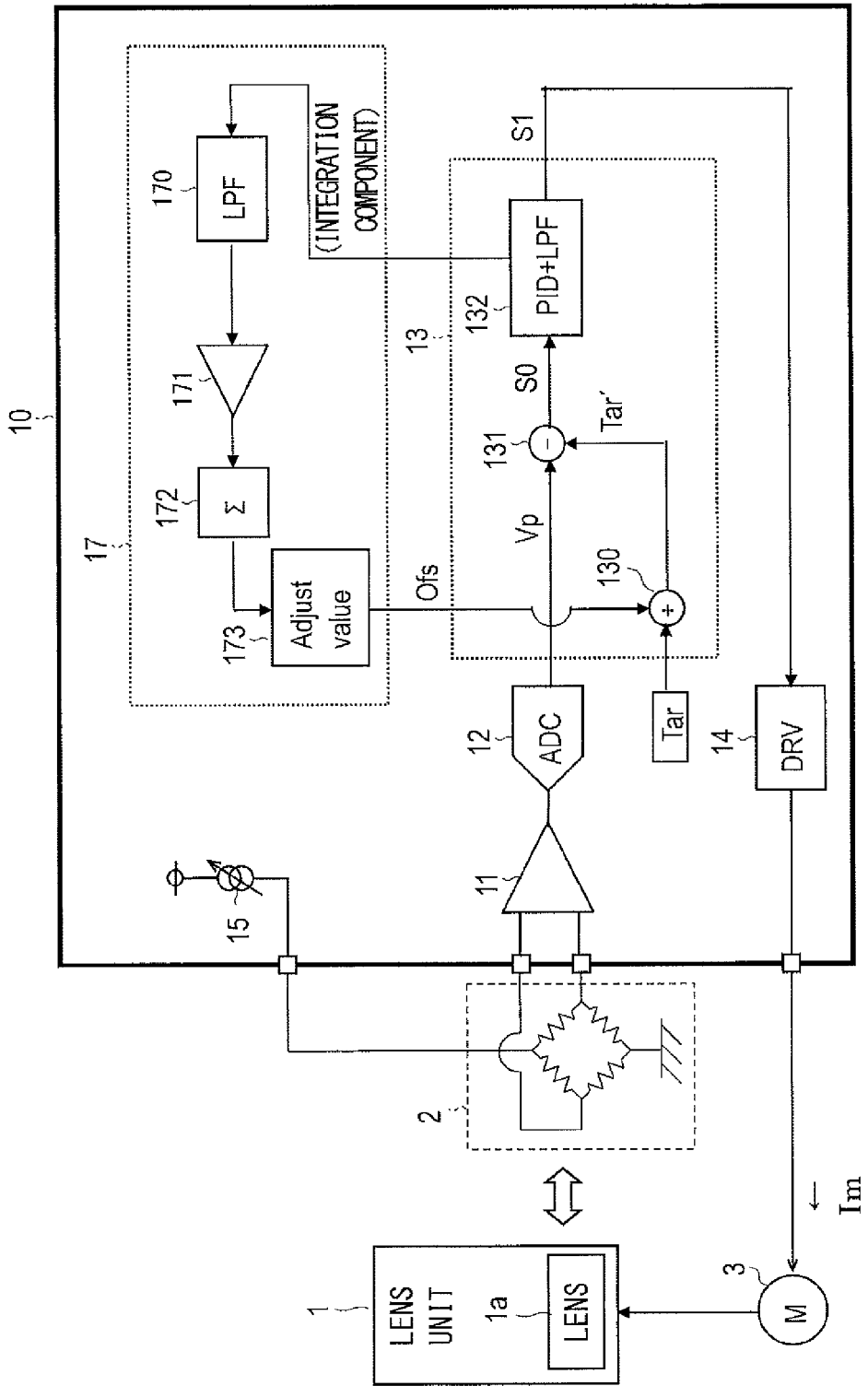
FIG. 4 is a block diagram of a lens control device according to a second embodiment of the present invention.

The second embodiment of the present invention will now be described. FIG. 4 is a block diagram of a lens control device (furthermore, an image sensing device including such a lens control device) according to the second embodiment. The same constituent components as in the first embodiment are identified with the same symbols as in FIG. 1, and thus their description will not be repeated; the feature of the second embodiment will be described below in detail.

As has already been described, the filter circuit 132 performs the PID processing as one type of digital filter processing on the deviation signal S0. In the present embodiment, instead of the motor current setting value S1 being input to the low pass filter 170, a signal indicating an integration component (a register value within the filter circuit 132) obtained in the PID processing is input thereto.

Thus, the lens control device 10 uses information on the integration component obtained in the PID processing and thereby can adjust the correction offset signal Ofs such that the average value of the motor current Im approaches zero.

<Third Embodiment>

Figure 5:
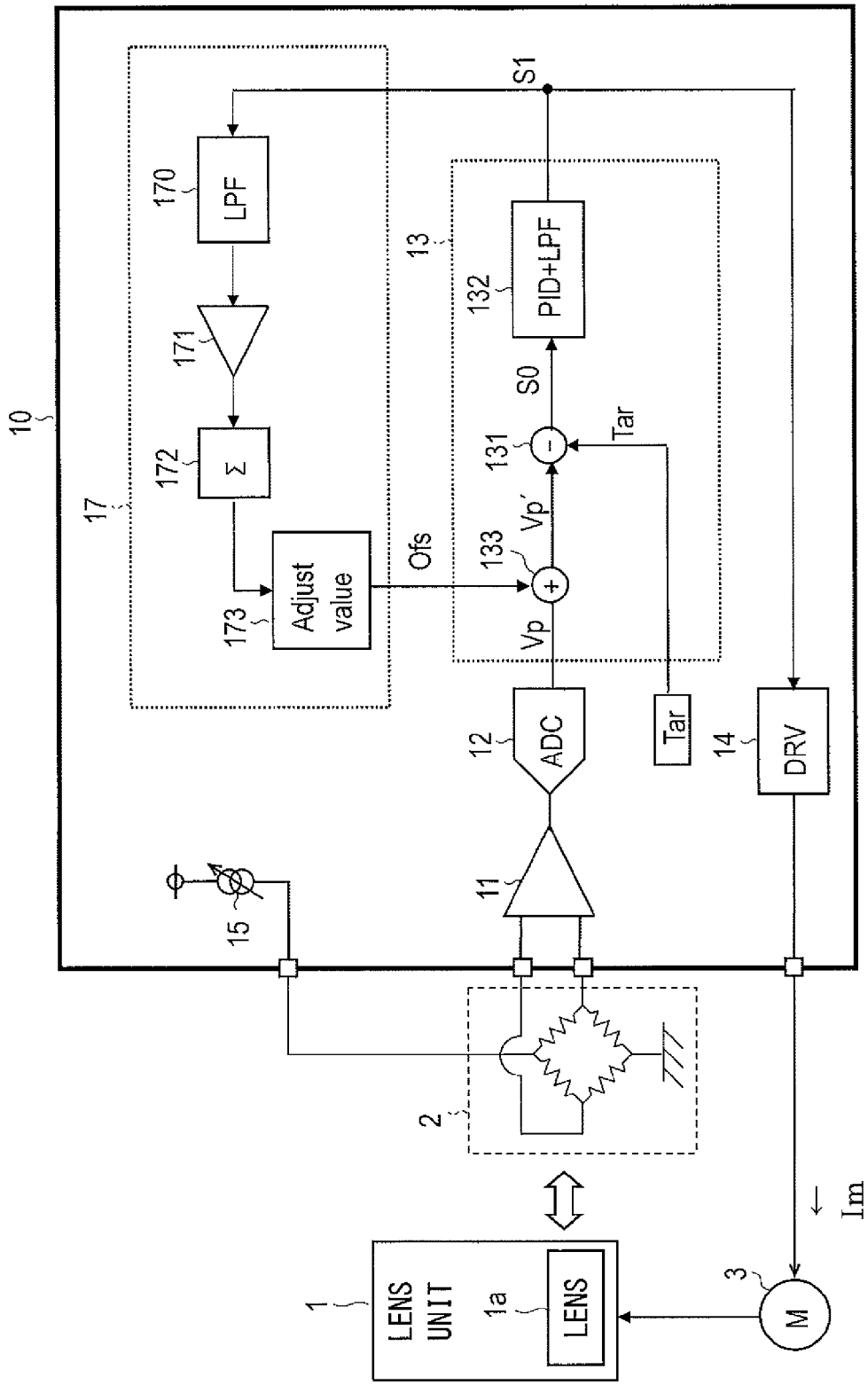
FIG. 5 is a block diagram of a lens control device according to a third embodiment of the present invention.

The third embodiment of the present invention will now be described. FIG. 5 is a block diagram of a lens control device (furthermore, an image sensing device including such a lens control device) according to the third embodiment. The same constituent components as in the first embodiment are identified with the same symbols as in FIG. 1, and thus their description will not be repeated; the feature of the third embodiment will be described below in detail.

The lens control device 10 of the present embodiment differs from that of the first embodiment in that the first addition circuit 130 is not provided in the servo computation portion 13 and that a second addition circuit 133 is provided instead.

The correction offset signal Ofs (digital signal) is input from the offset signal generation circuit 173 to the second addition circuit 133. Then, the second addition circuit 133 adds the correction offset signal Ofs to the lens position detection signal Vp (digital signal), and thereby generates a corrected lens position detection signal Vp' (Vp+Ofs) that is a digital signal. The subtraction circuit 131 subtracts the corrected lens position detection signal Vp' from the target lens position setting signal Tar, and thereby generates the deviation signal S0 (=Tar−Vp'). As described above, in the present embodiment, the correction offset signal Ofs is used, with the result that the target lens position setting signal Tar is not corrected but the lens position detection signal Vp that is a digital signal is corrected.

Even in the present embodiment, the deviation signal S0 corresponds to the deviation of the position of the lens 1a from the target position to which the correction offset has been added. The present embodiment is the same as the first embodiment in that the motor current setting value S1 is calculated such that the value of the deviation signal S0 is decreased, and thus the average value of the motor current Im approaches zero. In other words, the correction using the correction offset signal Ofs may be performed as in the present embodiment, and thus it is possible to obtain the same result as in the first embodiment.

<Fourth Embodiment>

Figure 6:
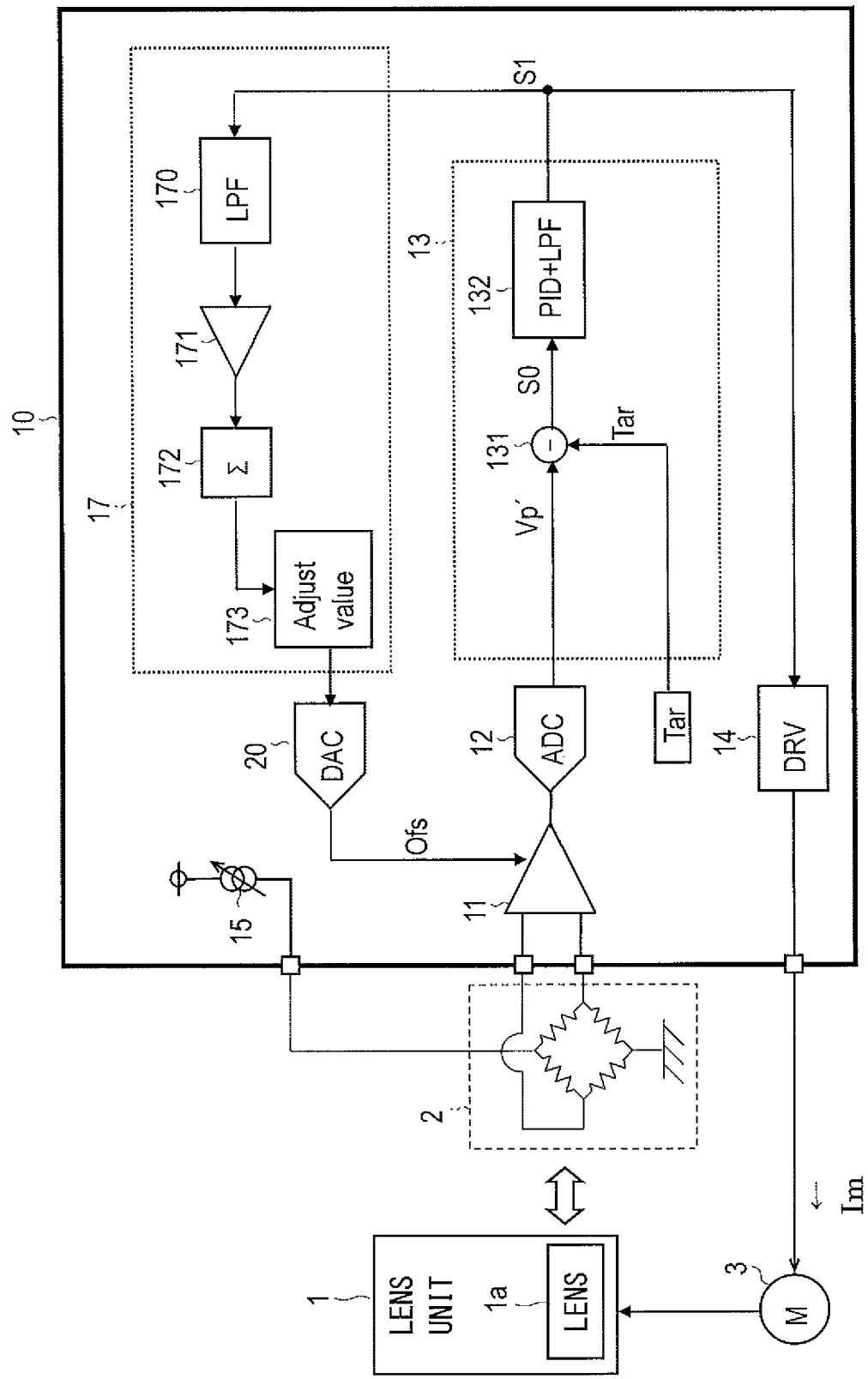
FIG. 6 is a block diagram of a lens control device according to a fourth embodiment of the present invention.

The fourth embodiment of the present invention will now be described. FIG. 6 is a block diagram of a lens control device (furthermore, an image sensing device including such a lens control device) according to the fourth embodiment. The same constituent components as in the first embodiment are identified with the same symbols as in FIG. 1, and thus their description will not be repeated; the feature of the fourth embodiment will be described below in detail.

The lens control device 10 of the present embodiment differs from that of the first embodiment in that the first addition circuit 130 is not provided in the servo computation portion 13 and that a digital/analogue converter 20 is further provided.

The digital/analogue converter 20 converts, from digital to analogue, the correction offset signal Ofs (digital signal) that is input from the offset signal generation circuit 173, and outputs the resulting signal to the amplifier 11. Thus, the correction offset signal Ofs (analogue voltage signal) is added to the lens position detection signal Vp (analogue voltage signal), and the corrected lens position detection signal Vp' (=Vp+Ofs) that is an analogue voltage signal is generated.

The corrected lens position detection signal Vp' is converted by the analogue/digital converter 12 from analogue to digital, and is output to the servo computation portion 13.

As described above, in the present embodiment, the correction offset signal Ofs is used, with the result that the target lens position setting signal Tar is not corrected but the lens position detection signal Vp that is an analogue voltage signal is corrected.

Even in the present embodiment, the deviation signal S0 corresponds to the deviation of the position of the lens 1a from the target position to which the correction offset has been added. The present embodiment is the same as the first embodiment in that the motor current setting value S1 is calculated such that the value of the deviation signal S0 is decreased, and thus the average value of the motor current Im approaches zero. In other words, the correction using the correction offset signal Ofs may be performed as in the present embodiment, and thus it is possible to obtain the same result as in the first embodiment.

In the present embodiment, as compared with the third embodiment, it is necessary to provide the digital/analogue converter 20. However, in the present embodiment, since the correction offset signal Ofs is added to the lens position detection signal Vp that is an analogue signal, it is possible to more appropriately set the dynamic range on the conversion of the lens position detection signal Vp from analogue to digital. Needless to say, even in the third and fourth embodiments, as in the second embodiment, the correction offset signal Ofs may be adjusted using the information on the integration component obtained in the PID processing.

<Others>

As has been described above, the lens control device 10 of each embodiment of the present invention feeds, according to the motor current Im, the motor current Im to the lens drive motor 3, which drives the lens 1a. The lens control device 10 includes: the servo computation portion 13 that calculates the motor current setting value S1 such that the deviation of the position of the lens 1a from the target position to which the correction offset has been added is reduced; the motor driver 14 that generates the motor current Im according to the motor current setting value S1; and the calibration computation portion 17 that adjusts the correction offset such that the average value of the motor current Im approaches zero.

Hence, in the lens control device 10 (furthermore, the image sensing device including such a lens control device), it is possible to keep the position in which the lens is held and the center of the shift movement near the balance position (ideally, in the balance position), and it is possible to minimize the motor current necessary for controlling the position of the lens in the camera shake correction. Although the lens control device 10 can be applied to various devices, since the lens control device 10 has the advantage in power consumption saving, the lens control device 10 is extremely useful especially as a component of a mobile device (such as a mobile telephone) in which a power supply capacity is limited.

The lens control device 10 is configured to control the position of the lens as described above for each direction in which the position of the lens needs to be controlled. For example, when the number of directions in which the lens 1a is moved is three, the lens control device 10 controls, as described above, the position of the lens 1a for each of the three directions.

In the present invention, in addition to the above embodiments, many modifications are possible without departing from the spirit of the present invention. Specifically, the above embodiments are considered to be illustrative in all respects, not restrictive; the technical scope of the present invention is indicated not by the description of the above embodiments but by the scope of claims; the scope of claims, their equivalent meanings and all modifications falling within the scope are understood to be included.

According to the present invention, it is possible to provide: a lens control device that can keep the position in which the lens is held and the center of the shift movement near the balance position; and an image sensing device using such a lens control device. The present invention can be applied to, for example, a lens control device having a camera shake correction function, and a digital still camera, a digital video camera and a camera module of a mobile telephone incorporating such a lens control device.

What is claimed is:

1. A lens control device that feeds a motor current to a lens drive motor which drives lens according to the motor current, the lens control device comprising:
   a servo computation portion that calculates a motor current setting value such that a deviation of a position of the lens to which a correction offset has been adjusted from a target position is reduced;
   a motor driver that generates the motor current according to the motor current setting value; and
   a calibration computation portion that adjusts the correction offset such that an average value of the motor current approaches zero.

2. The lens control device of claim 1, wherein, based on a lens position detection signal indicating a current position of the lens, a target lens position setting signal indicating the target position and a correction offset signal indicating the correction offset, a deviation signal corresponding to the deviation is generated, and, based on the deviation signal, the motor current setting value is calculated.

3. The lens control device of claim 2, wherein the calibration computation portion integrates the motor current setting value, and adjusts, based on a result of the integration, the correction offset.

4. The lens control device of claim 2, wherein the servo computation portion performs PID processing on the deviation signal, and the calibration computation portion adjusts the correction offset using information on an integration component obtained in the PID processing.

5. The lens control device of claim 2, wherein the correction offset signal is used such that the target lens position setting signal is corrected.

6. The lens control device of claim 2, wherein the lens position detection signal is generated by converting, into a digital signal, an analogue signal that is output from a lens position detection sensor and that indicates the current position, and the analogue signal is corrected using the correction offset signal.

7. The lens control device of claim 2, wherein the lens position detection signal is generated by converting, into a digital signal, an analogue signal that is output from a lens position detection sensor and that indicates the current position, and the digital signal is corrected using the correction offset signal.

8. The lens control device of claim 2, wherein the target lens position setting signal is generated based on a result of detection of an angular velocity sensor.

9. An image sensing device comprising:
   a lens;
   a lens position detection sensor that detects a current position of the lens;
   a lens drive motor that drives the lens according to a motor current; and
   the lens control device of claim 1 that feeds the motor current to the lens drive motor.

* * * * *